United States Patent [19]

Towe

[11] Patent Number: 5,273,578

[45] Date of Patent: Dec. 28, 1993

[54] LIGHT-MODIFYING COMPOSITION

[76] Inventor: Michael Towe, 2158 Montgomery Street, Montreal, Quebec, Canada, H2K 2R8

[21] Appl. No.: 42,394

[22] Filed: Apr. 2, 1993

[51] Int. Cl.⁵ .............................................. C04B 14/04
[52] U.S. Cl. .................................... 106/482; 106/464
[58] Field of Search ................................ 106/482, 464

[56] References Cited

U.S. PATENT DOCUMENTS

| | | | |
|---|---|---|---|
| 4,851,048 | 7/1989 | Jones et al. | 106/464 |
| 5,120,365 | 6/1992 | Kogler | 106/464 |
| 5,151,124 | 9/1992 | Rice | 106/464 |
| 5,190,583 | 3/1993 | Menzel et al. | 106/482 |

Primary Examiner—Mark L. Bell
Assistant Examiner—Willie J. Thompson
Attorney, Agent, or Firm—Larson and Taylor

[57] ABSTRACT

A light-modifying composition comprising a color pigment component and a pigment spacer component characterized by being a transducing material having the ability to absorb light and reflect at least part of the light absorbed, thereby modifying the light in the coating resulting from the application of the composition. Such pigment spacing component includes any material having the ability to partially absorb light. Preferred are neutral grey pigments in the form of grey powders having a minimal color producing effect. The pigments can be in the form of ground grey powders such as powders taken from granite, feldspar, quartz or limestone or in the form of spherical metallic particles such as metallic zinc.

8 Claims, No Drawings

LIGHT-MODIFYING COMPOSITION

FIELD OF THE INVENTION

The invention relates to pigmented coatings. In particular, the invention, in its simplest form, relates to a light-modifying composition comprising a color pigment component and a pigment spacer component characterized by being a transducing material having the ability to absorb light and reflect at least part of the light absorbed, thereby modifying the light in the coating resulting from the application of the composition. Such pigment spacing component includes any material having the ability to partially absorb light. Preferred are neutral grey pigments in the form of grey powders having a minimal color producing effect. The pigments can be in the form of ground grey powders such as powders taken from granite, feldspar, quartz or limestone or in the form of spherical metallic particles such as metallic zinc.

BACKGROUND OF THE INVENTION

The coating industry is one of considerable importance in the industrialized world. It has ramifications extending in various technological areas. Hence, paints have been designed for the protection and decoration of masonry coatings, ferrous metals, nonferrous metals, wood substrates and the like. Also, paints have been designed to provide special properties to the surface on which they are applied. Examples include the pigmentation of anti-foulants, electrocoatings, flame resistant and intumescent paints, heat-resistant paints and fluorescent paints. Pigments have also been used to prepare inks and to color paper goods. Other examples of use of coatings include the pigmentation of rubbers, plastics, cosmetics, magnetic tapes, food, textiles, adhesives and ceramics.

With current technology, almost any type of coating composition prepared comprises binders, pigments and extenders which are combined to obtain the desired result. The most commonly used pigment is titanium dioxide. Titanium dioxide is insoluble in all liquids, with the exception of concentrated sulfuric acid and hydrofluoric acid. Titanium dioxide molecules produce a highly reflective white powder. The paint industry has by far the most widely diversified manufacturing requirements because each basic paint type such as flat, semi-gloss and enamel require different kinds and amounts of treatments using titanium dioxide. Still, titanium dioxide is used as a pigment by a large number of major industries such as paints, paper, plastics, rubbers, floor coverings, printing inks, ceramics, coated fabrics and roofing granules. All these industries have their specific requirements but the versatility of titanium dioxide has allowed adaptation of its use for various purposes.

Titanium dioxide produces the effect of whiteness on the human eye because it reflects all wavelengths of visible light to the same degree. Under red light, it appears red; under blue light, blue and under green light, green. Only under illumination containing all of the wavelengths of visible light does titanium dioxide appear white. This property coupled with the extremely high stability of the compound has led to its widespread use in the coating industry.

As a general rule, shades of color are obtained by mixing color pigments with black and white pigments. At the microscopic level, the white titanium dioxide pigments are very bright and their reflectivity is countered by the use of black pigments. This is generally how colors are made. Extenders in the form of ground powders having a particle size of usually 1 to 10 microns as well as binders which can be selected from a wide array of chemicals can be used to hold the pigments together to form an applicable composition.

However, the extreme stability of titanium dioxide, although an advantage from a technological point of view, is a serious drawback from an environmental point of view because any release of such a chemical in the environment can potentially create serious environmental hazards. The production of titanium dioxide causes the creation of massive amounts of highly toxic sulfur derivative by-products which are often released in the environment.

Beyond the environmental considerations is the fact that the use of strongly reflective pigments such as titanium dioxide in the production of colors can lead to problems when attempting to produce very specific colors such as those found in nature. In fact, the brightness of titanium dioxide makes it almost impossible to produce something other than colors of high reflectivity.

SUMMARY OF THE INVENTION

In accordance with the present invention, there is provided a light-modifying composition comprising a color pigment and a grey pigment characterized by having the ability to absorb light and reflect at least part of the light absorbed. The grey pigment acts to substantially evenly reduce the amount of light flux within the composition and in some instances to evenly space the pigment in the composition. The term "grey pigment", when used herein, is intended to designate any material of a grey appearance having essentially no chroma. A wide variety of grey pigments can be used in the context of the present invention. The important aspect is the fact that the grey pigment must absorb light and reflect only a certain percentage of it. Preferred grey pigments to be used are neutral greys but the use of greys having between 5 and 90% reflectance can be contemplated. Examples of grey pigments that can be used include ground powders such as granite, feldspar, quartz and limestone powders. Also within the scope of the present invention is a coating base composition comprising a grey pigment dispersed in a solvent. The grey pigment is also characterized by having the ability to absorb light and reflect at least part of the light absorbed.

The light-modifying compositions of the present invention are characterized by the absence of white and black pigments, although the presence of white or near white fillers is not excluded. The absence of white and black pigments allows the color pigment to be more predominant and to exist in a more natural light environment. Until the present, the field of coatings has been based upon the preparation of compositions including titanium dioxide, binders and extenders. The light-modifying composition of the present invention represents a departure from previous coating technology by avoiding the use of traditional white and black pigments. By doing so, the required amount of color pigment can be substantially reduced because the pigment particles are not overshadowed by either strongly reflecting white or strongly absorbing black pigment particles. This is possibly accomplished by providing a scale of light flux which results from the use of materials which absorb only a portion of the light in the coating film and provides a more even light environment for the color pigments.

In one of its preferred aspects, the present invention makes use of particulate grey pigments having a particle size of 40 μm or less. However, any transducing material having the ability to produce gradual light flux reduction in a film or to convert light into another form of non-visible energy, such as osmium, can be used.

In the past, in order to prepare coatings in a relatively economical manner, the use of white fillers was predominant. In fact, white fillers were the only extenders used to space pigment particles in a coating. Unfortunately, the use of white fillers was restricted to lighter tints available for any given pigment.

In order to achieve darker colors, it is often necessary to tone the composition with a black pigment. The drawback to this approach is that the resulting color emitted by the composition loses clarity and intensity as a result of an uneven loss in light flux caused by the absorption of light by the black pigment and by the contrast created by the white pigment which maintains a high light contrast ratio in the film. The only solution up to now was to add additional costly pigment to make up for the loss in intensity.

With the present invention, the spacing of pigments in the darker tonal ranges is allowed without the loss of intensity experienced with the use of black pigments. The use of neutral grey pigments or almost neutral grey pigments of various reflectance, generally from 5 to 90% reflectance, but not restricted exclusively to this range, and visually identified as light grey, medium grey, dark grey etc., and mixtures thereof, reduces the amount of light flux in the film body in a more or less even fashion across the visible spectrum. This in effect creates a more even lighting effect in the film and by the reduction in contrast allows the pigment particles to become brighter in the lowering reflective grey surround.

When a neutral grey pigment or a sequence of neutral grey pigment is used, there is no sudden loss of flux since the grey still reflects light and the resulting flux density is reduced much more gradually, allowing the color pigment particles to give off variable light flux This situation cannot occur when either black and white pigments or a black pigment and a white filler are used because the use of mixed black and white pigments results in an uneven distribution of light. With the use of a grey pigment, light is distributed more evenly in the coating and this allows one to achieve much finer nuances in color tinting. The even decrease in light reflection experienced when using grey pigments, as opposed to complete light reflection and absorption experienced with black and white pigments, provides a greater range of useful light flux intensities which in turn provides a spectrum of energies available for the color pigment particles. The resulting color is viewed as more intense since the intensity would be of those wavelengths reflected by the color pigments.

It should also be noted that the grey particles can reflect light without altering significantly the color of the film of the composition but only the intensity or flux of light from the film. Still, the resulting color composition has some grey in its body. Without wishing to be bound by any theory, because of the visibility of the grey pigment, as the concentration of grey pigment particles increases, it becomes more visually apparent that there is grey in the composition. A more efficient grey allows a reduction in volume of grey pigment in the composition to achieve the same effect, thereby losing the grey appearance of the resulting color. Achieving a more efficient grey can be accomplished by varying particle size, particle shape and index of refraction or by converting light into another form of energy. In using the composition of the present invention, there is observed an interaction between the light reduction and the spacing effect of the grey pigments on the color pigment, thereby producing the two mechanisms needed to achieve color ranges of marked freshness and intensity. This in fact allows for colors that exist in nature to be produced, which is not possible when using black and white fillers or white pigments and white fillers.

In one of the preferred embodiments of the light-modifying composition of the present invention, a binder is used to bind the grey and color pigments together. However, in some applications such as the preparation of cosmetics, the use of a binder is not necessary.

The present invention will be more readily illustrated by referring to the following description.

DETAILED DESCRIPTION OF THE INVENTION

In its broadest terms, the present invention provides a new approach to the preparation of color coatings. This new approach is based on the elimination of white and black pigments commonly used in the preparation of color coatings.

White and black pigments represent complete opposites in terms of reflectivity and light absorption. They have been used to tone color when attempting to reach the desired shade.

With the present invention, this approach has been discarded and a new concept is set forth by which white and black pigments are replaced by grey pigments having a reflective index which is lower than the reflective index of white pigments and higher than the reflective index of black pigments. This range of possible reflective indices for the grey pigments is referred to herein as "middle reflectivity". The middle reflectivity of the grey pigments used in the context of the present invention eliminates the excessive brightness caused by the standard titanium dioxide pigments as well as the reduced number of internal reflections caused by black pigments. In other words, it has been demonstrated that the colors achieved by combining white and black pigments and a color pigment can be enhanced when replacing the white and black pigments with a grey pigment. For example, when identical grey colors are prepared using either black and white pigments or grey pigments, the same addition of color pigments gives a final coating having very different luminosities. The initial appearances of the grey bases are identical, but the addition of the same quantities of color pigments provides much more intense colors in the base containing the grey pigment. This, as mentioned previously, is likely to be achieved because of a more even distribution of the internal reflections occurring in the coating.

The composition of the present invention comprises a limited number of components, with the grey pigment being the central component allowing the achievement of the desired range of colors. When used in the context of the present invention, the term "grey pigment" is also intended to designate any pigment having a middle reflectivity. Preferred materials which can be used as grey pigments will be described in further details but it is to be appreciated that the light modifying compositions of the present invention are not restricted to this type of pigment. Similarly, a wide variety of binders and color pigments can be used in the light-modifying composition of the present invention and the present disclosure is not to be interpreted as being limited to those color pigments and binders described herein.

Grey pigment

As mentioned previously, the grey pigment is the central component of the light-modifying composition falling within the scope of the present invention. The grey pigment acts as a spacer for color pigments providing a more even light distribution throughout the coating. In this regard, the grey pigment material controls both value and chroma of the resulting coating. It acts by reducing the amount of light reflected in the coating and spacing the color pigments. These are the characteristic benefits encountered when using grey pigments.

In a preferred embodiment of the present invention, the grey pigment is either in the form of ground powders taken from materials such as granite, feldspar, quartz and limestone ($CaCO_3$) or in the form of spherical metallic zinc powder particles. A number of parameters can be adjusted to provide the desired reflectance in this grey pigment. Firstly, the particle size of the ground powder can have a substantial influence on the tone of the coating. Particle sizes ranging from 1 to 40 micrometers are usually preferred, with 1 to 20 micrometers being most preferred. Also, the reflectance of the specific grey pigments used has an influence on the final color. For example, ground calcium carbonate powder has a reflectance of approximately 30% but it can be combined with other grey powders of lower or higher reflectance to obtain the desired color. The reflectance can range between 5 and 90% but the most useful materials appear to be the neutral greys having a medium range reflectance ranging between 30 and 80%.

The amount of grey pigment that is used in the composition of the present invention is usually substantial. This is the case because the middle reflectance of the grey pigments allows for use of very small amounts of color pigments. In most applications, a binder will also form part of the composition but the percentage of binder used is relatively low. Consequently, the percentage of grey pigment used usually varies between 10 and 70% by weight, depending on which application is contemplated. Preferred percentages range between 20 and 50% by weight. However, much lower percentages can be used if the grey pigment is in the form of zinc powder.

Color pigments

Various color pigments can be used in the light-modifying composition of the present invention. The color pigment can be either inorganic or organic, depending on the contemplated application.

In the case of inorganic pigments, oxides such as natural or synthetic colored iron oxides or chromium oxides can be used. The use of chromate such as lead chromate and chrome green pigments is also possible. Cadmium and ferriferrocyanide pigments as well as other inorganic color pigments such as ultramarine pigments, mercuric sulfide and synthetic inorganic complexes can also be used to form the composition of the present invention.

In the case of organic color pigments, the possibilities are also very wide. One can refer to the use of nitroso, nitromonoazo, diazo and disazo pigments. Basic dye pigments, alkali blues, peacock blue lake, phloxine, quinacridones, lake of acid yellow, carbazole dioxazine violet, alizarine lake, vat pigments, phthalocyanine and tetrachloroisoindolinone can also be used in the context of the present invention.

Also, metallic pigments such as aluminum flakes, copper and copper alloy flake powders, zinc pigments and stainless steel flake pigments can be used with the grey powder pigment described above. One can also contemplate the use of metal protective pigments, nacreous pigments, luminescent pigments, functional pigments as well as food, drug and cosmetic colors.

The percentage of color pigment used is not a critical aspect of the invention. It can be varied through a wide range of concentrations and is a function of the color which one wishes to obtain. Preferably, the percentage of color pigment varies between 0.25 and 25% by weight. In situations where very intense colors are desired, the percentage of color pigment can exceed this range. Similarly, in situations where very pale colors are desired, the percentage of color pigment can be less than this range. These exceptions fall within the scope of the present invention. Also, it would appear preferable that the pigment used in the composition exhibits a reflectance which is higher than the reflectance of the grey pigment particles.

Binders

In certain applications of the composition of the present invention, it might be necessary to use a binder component to form an applicable composition. A wide variety of binders such as oils, varnishes, latex emulsions, styrene, styrene butadiene, polyvinyl acetate, acrylic, acrylic-styrene, acrylic polyvinyl acetate, polyurethanes and the like can be used. These are known to the person skilled in the art. It is to be appreciated however that binders other than those referred to above can be efficiently employed.

The percentage of binder used in the context of the present invention can vary from 0% to 50% by weight. In some applications relating to the cosmetic industry, for example, the use of a binder can sometimes be discarded.

Additives

A wide variety of additives can be incorporated into the composition of the present invention to impart different properties to the final product depending on its final use. Such additives include dispersants, surfactants, defoamers, thickness and the like. The choice and amount of additive is dictated by the end use and is within the knowledge of the person skilled in the art.

Preparation of the light-modifying composition of the present invention

Once a pigment binder of appropriate particle size and shape has been obtained, the composition of the present invention is typically prepared by first producing a slurry of the grey pigment, essentially to disperse the grey pigment in the desired solvent. Typically, the grey pigment particles are mixed with an appropriate solvent, for example water, oils or a long chain alcohol such as propylene glycol and ethylene glycol, together with suitable additives required to produce and maintain a uniform slurry such as wetting agents, dispersants, surfactants, defoamers, thickeners and the like, the use of which is within the knowledge of the skilled artisan. The mixing time can vary depending on the additives used but should be sufficient to adequately disperse the grey pigment particles within the slurry. A typical mixing time using a high speed disperser varies from 10 to 30 minutes.

To the resulting grey pigment slurry is then added a binder and the additives required to achieve the desired characteristics for the final coating. At this stage of the process, additives such as thickness, preservatives, defoamers, buffers to maintain the desired pH, coalescence and the like can be used. Again, the choice of binders and additives is within the knowledge of the person skilled in the art.

After the binder has been incorporated into the slurry, the color pigment is added in sufficient amounts to yield the desired color. The amount and nature of the pigment can be varied depending on the end result desired. Alternatively, the grey and color pigments can be dispersed together in the initial slurry mixture once the color pigment requirements to achieve the desired result are known. In some instances, it may even be advisable to fix the color pigments to the grey pigment particles through preliminary mixing with the appropriate chemicals which are within the knowledge of the skilled artisan. This can be accomplished by using a fixing process similar to the process used for fixing dyes.

It is to be noted that the method described above is to be viewed as a general guide for the preparation of colored coatings using grey pigments. Modifications are possible depending on the end use and fall within the scope of the invention.

Application of the composition of the present invention for the preparation of various coatings The composition of the present invention can be used in numerous applications including the preparation of masonry coatings, paints for ferrous and non-ferrous metals, trade sales paints for wood substrates, anti-foulants, electrocoatings, flame-resistant and intumescent paints, heat-resistant paints, fluorescent paints, joint fillers, inks, inks for paper goods, inks for elastomers, inks for plastics, cosmetics, markers, magnetic tapes, food stuffs, textiles, adhesives, ceramics, artists colors, photoconductive coatings and concrete and mortar. Descriptions of procedures used to prepare coatings for these different applications are described in the Pigment Handbook (Temple C. Patton, Wiley-Interscience, 1973, Volumes 1 to 3) which is hereby incorporated by reference. In most instances, the use of the present invention involves the replacement of white and black pigments by a grey pigment. This can involve changes in parameters but these modifications are well within the purview of the person skilled in the art.

EXAMPLE 1

Preparation of a green artist paint using a grey pigment

To 740 ml of water were added 25 ml of Tamol 731 dispersant (Rohm and Haas), 5 ml of CF10 50% surfactant (Triton-Rohm and Haas), 165 ml vol. of QP40-10% conc. ethyl cellulose thickener (Union carbide), 30 ml vol. of NXZ defoamer (Diamond Shamrock) and 2.27 kg of 325 mesh grey granite powder.

The resulting mixture was dispersed in a high speed disperser for 15 minutes to yield a grey pigment slurry which was then added to the letdown phase. To the slurry were added 2.48 liters vol. of Rhoplex AC64 acrylic binder (Rohm and Haas), 88 ml vol. of water, 30 ml vol. of Texanol coalescent (Eastman Kodak), 13 ml of Nopco NXZ defoamer (Diamond Shamrock), 7 ml of Proxel GXL preservative (ICI), 23 ml of amino-methylpropanol buffer, 80 ml of QP40-10% cellulose and 103 ml vol. of ASE60-12.5% conc. of Acrysol thickener (Rohm and Haas). The resulting solution was mixed for approximately 20 minutes to yield approximately 4.43 liters vol. of grey paint having a 30% binder content and a total solids content of about 50%. To the grey paint was added sufficient green cobalt pigment either in paste form or in a paint format until the desired green color was obtained.

Alternatively, to a cobalt green artist paint was added sufficient amounts of grey slurry (before the letdown) to achieve the desired tone of green. In some instances, it was necessary to add more acrylic emulsion (in the form of a gloss medium) to impart the desired flexibility and gloss to the resulting composition.

Claims to the invention follow.

I claim:

1. A light-modifying composition comprising a color pigment and a grey pigment selected form the group consisting of granite, feldspar, quartz and limestone characterized by having the ability to absorb light and reflect at least part of the light absorbed, said grey pigment acting substantially gradually to reduce the amount of light flux in said composition and to evenly space said color pigment in said composition.

2. A light-modifying composition according to claim 1, further comprising a binder substance for binding said color pigment to said grey pigment.

3. A light-modifying composition according to claim 1, wherein said grey pigment is characterized by having a reflectivity ranging between 5 and 90%.

4. A light-modifying composition according to claim 1, wherein said grey pigment is characterized by having a reflectivity ranging between 10 and 70%.

5. A light-modifying composition according to claim 1, charactarized in that said grey pigment comprises particles having a size ranging from 1 to 40 micrometers.

6. A light-modifying composition according to claim 5, characterized in that said grey pigment comprises particles having a size ranging from 1 to 20 micrometers.

7. A light-modifying composition according to claim 1, wherein said composition is free of black pigments and titanium dioxide pigments.

8. A light-modifying composition according to claim 1, wherein the amount of color pigment in said composition ranges between 0.25 and 25% by weight.

* * * * *